United States Patent
Sharma et al.

(10) Patent No.: US 7,184,402 B1
(45) Date of Patent: Feb. 27, 2007

(54) METHOD FOR MULTI-LINK LOAD BALANCING TO IMPROVE SEQUENCED DELIVERY OF FRAMES AT PEER END

(75) Inventors: Rohit Sharma, Milpitas, CA (US);
Chang Ahn, San Jose, CA (US);
Swaminathan Sundararaman, San Jose, CA (US)

(73) Assignee: Cisco Technology, Inc, San Jose, CA (US)

( * ) Notice: Subject to any disclaimer, the term of this patent is extended or adjusted under 35 U.S.C. 154(b) by 976 days.

(21) Appl. No.: 09/944,782

(22) Filed: Aug. 30, 2001

(51) Int. Cl.
*H04L 12/46* (2006.01)

(52) U.S. Cl. ...................... 370/232; 370/462
(58) Field of Classification Search ............. 370/230, 370/464–465, 231–235, 230.1, 468, 470, 370/471, 237
See application file for complete search history.

(56) References Cited

U.S. PATENT DOCUMENTS

| | | | |
|---|---|---|---|
| 4,703,475 A | 10/1987 | Dretzka et al. | |
| 5,153,877 A | 10/1992 | Esaki et al. | |
| 5,224,099 A | 6/1993 | Corbalis et al. | |
| 5,274,643 A | 12/1993 | Fisk | |
| 5,313,454 A * | 5/1994 | Bustini et al. | 370/231 |
| 5,341,366 A | 8/1994 | Soumiya et al. | |
| 5,359,592 A | 10/1994 | Corbalis et al. | |
| 5,359,593 A | 10/1994 | Derby et al. | |
| 5,361,259 A * | 11/1994 | Hunt et al. | 370/402 |
| 5,420,857 A | 5/1995 | Jurkevich | |
| 5,422,880 A | 6/1995 | Heitkamp et al. | |
| 5,483,526 A * | 1/1996 | Ben-Nun et al. | 370/395.7 |
| 5,561,663 A | 10/1996 | Klausmeier | |
| 5,617,417 A | 4/1997 | Sathe et al. | |
| 5,687,167 A | 11/1997 | Bertin et al. | |
| 5,729,546 A | 3/1998 | Gupta et al. | |

(Continued)

FOREIGN PATENT DOCUMENTS

WO    WO 99/65194 A1    12/1999

OTHER PUBLICATIONS

Enhanced Frame Solutions Multilink Frame Jul. 2001 by Lucent Technologies Inc.*

(Continued)

*Primary Examiner*—Hassan Kizou
*Assistant Examiner*—Salman Ahmed
(74) *Attorney, Agent, or Firm*—Blakely, Sokoloff, Taylor & Zafman LLP (57) ABSTRACT

A distribution pattern is established to distribute multilink frame relay (MFR) fragments. The distribution pattern includes a sequence of link entries associated with links in a link bundle. A number of link entries in the distribution pattern is determined by dividing a total link speed of the link bundle by a minimum possible link speed supported by a system. Each link entry is placed in the distribution pattern when the associated link is capable of transmitting a current fragment in a fastest transmit time. The fastest transmit time is determined based on the link speed of the link and a transmit time for the link to transmit other fragments previously allocated to that link. The fragments are distributed to the links in the link bundle according to the distribution pattern from a first link entry to a last link entry in the distribution pattern. The distribution pattern is repeated after the last link entry.

51 Claims, 5 Drawing Sheets

U.S. PATENT DOCUMENTS

| | | |
|---|---|---|
| 5,764,626 A | 6/1998 | VanDervort |
| 5,793,744 A | 8/1998 | Kanerva et al. |
| 5,815,492 A | 9/1998 | Berthaud et al. |
| 5,872,771 A | 2/1999 | Park et al. |
| 5,881,049 A | 3/1999 | Beshai et al. |
| 5,898,691 A | 4/1999 | Liu |
| 5,917,804 A | 6/1999 | Shah et al. |
| 5,926,475 A | 7/1999 | Saldinger et al. |
| 5,936,940 A | 8/1999 | Marin et al. |
| 5,940,372 A | 8/1999 | Bertin et al. |
| 5,970,067 A | 10/1999 | Sathe et al. |
| 6,028,840 A | 2/2000 | Worster |
| 6,041,039 A | 3/2000 | Kilkki et al. |
| 6,052,385 A | 4/2000 | Kanerva et al. |
| 6,061,348 A | 5/2000 | Castrigno et al. |
| 6,084,858 A | 7/2000 | Matthews et al. |
| 6,115,374 A | 9/2000 | Stonebridge et al. |
| 6,160,808 A | 12/2000 | Maurya |
| 6,167,030 A | 12/2000 | Kilkki et al. |
| 6,222,824 B1 | 4/2001 | Marin et al. |
| 6,256,309 B1 | 7/2001 | Daley et al. |
| 6,356,546 B1 | 3/2002 | Beshai et al. |
| 6,466,582 B2 * | 10/2002 | Venters et al. ............. 370/462 |
| 6,490,249 B1 | 12/2002 | Aboul-Magd et al. |
| 6,493,317 B1 | 12/2002 | Ma |
| 6,496,504 B1 | 12/2002 | Malik |
| 6,512,769 B1 | 1/2003 | Chui et al. |
| 6,526,060 B1 | 2/2003 | Hughes et al. |
| 6,529,498 B1 | 3/2003 | Cheng |
| 6,608,813 B1 | 8/2003 | Chiussi et al. |
| 6,608,815 B1 | 8/2003 | Huang et al. |
| 6,625,155 B1 | 9/2003 | Dziong |
| 6,678,264 B1 | 1/2004 | Gibson |
| 6,690,671 B1 | 2/2004 | Anbiah et al. |
| 6,724,881 B1 | 4/2004 | McAllister et al. |
| 6,731,599 B1 | 5/2004 | Hunter et al. |
| 6,747,972 B1 * | 6/2004 | Lenoski et al. ............. 370/394 |
| 6,778,495 B1 | 8/2004 | Blair |
| 6,819,658 B1 * | 11/2004 | Agarwal et al. ............ 370/316 |
| 6,826,196 B1 | 11/2004 | Lawrence |
| 6,862,284 B1 | 3/2005 | Spiegel et al. |
| 6,876,657 B1 * | 4/2005 | Brewer et al. .............. 370/394 |
| 6,891,836 B1 * | 5/2005 | Chen et al. ............ 370/395.51 |
| 6,934,249 B1 * | 8/2005 | Bertin et al. ................ 370/218 |
| 6,977,898 B1 | 12/2005 | Miriyala |
| 7,039,014 B1 | 5/2006 | Krishnamurthy et al. |
| 2002/0057649 A1 | 5/2002 | Kinnunen |
| 2005/0207371 A1 * | 9/2005 | Chen et al. ................. 370/321 |

OTHER PUBLICATIONS

Eidtor: Geoff Mattson, Nortel Networks, End-to-End Multilink Frame Relay Implementation Agreement, FRF.15, Frame Relay Forum Technical Comittee, Aug. 1999.

Editor: Mike Sheehan, Ascend Communications Corp., Multilink Frame Relay UNI/NNI Implementation Agreement, FRF.16, Frame Relay Forum Technical Comittee, Aug. 1999.

"Radcom Network Simulators and Analyzers," http://www.radcom.com/Products.aspx?boneld=660&pageCTemplate=0&print=2, 1 page (based on product prior to Dec. 18, 2001).

"Radcom Protocol Simulators/PNNI Simulator," http://www.radcom.com/Products.aspx?boneld=936&PageCTemplate=0&print=2, 2 pgs. (based on product prior to Dec. 18, 2001).

"Soft-ATM Private Network-to-Network Interface (PNNI)," http://www.ikon-gmbh.de/german/datasheets/netplane/pnni.htm (Jul. 12, 2001).

"PNNI: A little background," http://www.antc.utwente.nl/Reports/ATM/PNNI/pnni_background.html (Sep. 19, 2001).

"Protocol Directory - ATM Signaling & Routing," http://www.protocols.com/pbook/atmsig.htm (Nov. 14, 2001).

International Telecommunication Union (ITU), ITU-T, Q.2931. B-ISDN Application Protocols for Access Signaling (Feb. 1995).

The ATM Forum Technical Committee, "Addressing Addendum to ATM User-Network Interface (UNI) Signalling Specification, Version 4.0," ATM Forum document No. AF-CS-0107.000, Feb. 1999.

The ATM Forum Technical Committee, "UNI Signalling 4.0 Security Addendum," ATM Forum document No. AF-CS-0117.000, May 1999.

The ATM Forum Technical Committee, "Modification of Traffic Parameters for an Active Connection Signalling Specification (PNNI, AINI, and UNI), Version 2.0," ATM Forum document No. AF-CS-0148.001, May 2001.

The ATM Forum Technical Committee, "ATM User-Network Interface (UNI) Signalling Specification, Version 4.0," ATM Forum document No. af-sig-0061.000, Jul. 1996.

Saltouros, Marios P., et al., "A Scalable Qos-Based Routing Scheme for ATM Networks Using Reinforcement Learning Algorithms," University of Athens, Greece (1999).

* cited by examiner

| Fragment# | xmtTimeOnLinkA | xmtTimeOnLinkB | xmtTimeOnLinkC |
|---|---|---|---|
| 305 { 1 | 00.000000(Old) | 00.000000(Old) | 00.000000(Old) |
| 1 | 16.000000(New) | 24.000000(New) | 48.000000(New) |
| | --> SELECT "A" | | |
| 310 { 2 | 16.000000(Old) | 00.000000(Old) | 00.000000(Old) |
| 2 | 32.000000(New) | 24.000000(New) | 48.000000(New) |
| | --> SELECT "B" | | |
| 315 { 3 | 16.000000(Old) | 24.000000(Old) | 00.000000(Old) |
| 3 | 32.000000(New) | 48.000000(New) | 48.000000(New) |
| | --> SELECT "A" | | |
| 320 { 4 | 32.000000(Old) | 24.000000(Old) | 00.000000(Old) |
| 4 | 48.000000(New) | 48.000000(New) | 48.000000(New) |
| | --> SELECT "A" | | |
| 325 { 5 | 48.000000(Old) | 24.000000(Old) | 00.000000(Old) |
| 5 | 64.000000(New) | 48.000000(New) | 48.000000(New) |
| | --> SELECT "B" | | |
| 330 { 6 | 48.000000(Old) | 48.000000(Old) | 00.000000(Old) |
| 6 | 64.000000(New) | 72.000000(New) | 48.000000(New) |
| | --> SELECT "C" | | |

METHOD FOR MULTI-LINK LOAD BALANCING TO IMPROVE SEQUENCED DELIVERY OF FRAMES AT PEER END

FIELD OF THE INVENTION

The present invention relates generally to field of data transmission. More specifically, the present invention relates to a method and an apparatus for delivering frame segments when using multilink frame relay (MFR).

BACKGROUND

Frame relay is a telecommunication service designed for data transmission for intermittent traffic between local area networks (LANs) and between end-points in a wide area network (WAN). Frame relay puts data into individually addressed variable-size unit called a frame. A frame size can be as small as a few bytes to as large as a few thousand bytes. The variable frame size means that frame transmit time and delay would be different for different frames. Frame relay does not attempt to correct errors. When an error is detected in a frame, it is simply dropped. The end points are responsible for detecting and retransmitting dropped frames. This speeds up overall data transmission. A Frame relay frame can incorporate packets from different protocols such as Ethernet, X.25, and Internet Protocol (IP). These packets are collected into frames and delivered to the destinations. Transmitting the data in multiple frames gives frame relay statistical multiplexing and port sharing characteristics.

Frame relay technology is based on the concept of using virtual circuit (VC) connections. VC connections are two-way data paths between two ports that act as private lines in the network. There are two types of virtual circuits, switched virtual circuits (SVC) and permanent virtual circuits (PVC). For most services, the network provides a PVC, which means that users see a continuous, dedicated connection without having to pay for a full-time leased line, while the service provider figures out the route each frame travels to its destination. PVC ensures that packets always arrive in the right sequence so that they can be reassembled successfully.

While the number of applications running over networks has grown, the WAN bandwidth has not kept pace. As network traffic increases, frame relay users begin to experience bandwidth limitation. Eventually, the bandwidth in the connection runs out and workflow and productivity are seriously impacted. Multilink frame relay (MFR) was developed to address the need for more access bandwidth to support the ever-increasing number of networked applications. MFR is a packet transport protocol based on the adoption of the Frame Relay Forum's End-to-End MFR (FRF.15) and UNI/NNI MFR (FRF.16) Implementation Agreements. It provides physical interface emulation for frame relay devices by bundling multiple independent links to transport data. Bundling multiple independent links provides a logical link that produces greater bandwidth than any of the individual physical links. For example, multiple 56/64K bit/sec links or multiple T1 links can be bundled together and treated as a single logical link. Multiple 56/64K bit/sec circuits can also be used to provide fractional T1 access without provisioning a T1, and multiple T1/E1 circuits can be used to provide fractional T3/E3.

Using MFR, the frame relay frames are fragmented into multiple fragments based on a fragment size and distributed to the multiple physical links in the link bundle. There is a good chance that, except for a last fragment, all of the fragments will have the same size. One possible approach of distributing the fragments among the physical links in the link bundle is a round robin method where a first fragment is distributed to a first link, a second fragment is distributed to a second link, etc. until each link in the link bundle receives a fragment. The distribution repeats at the first link until all the fragments in the frame are distributed. Although the round robin approach is simple and easy to implement, it is not efficient because it does not take into consideration a possibility where the different links in the link bundle have different link speed. When that is the case, the faster link is often underutilized. In addition, a fragment distributed to a faster link will arrive at a destination faster than a fragment distributed to a slower link. As such, there is a more frequent possibility that the fragments will arrive at the destination out of sequence.

SUMMARY OF THE INVENTION

A link distribution method is disclosed. A distribution pattern is established to distribute multilink frame relay (MFR) fragments. The distribution pattern includes a sequence of link entries associated with links in a link bundle. A number of link entries in the distribution pattern is determined by dividing a total link speed of the link bundle by a minimum possible link speed that is supported by the system. A link entry is placed in the distribution pattern when the associated link is capable of transmitting a current fragment in a fastest transmit time. The fastest transmit time is determined based on the link speed of the link and a transmit time for the link to transmit other fragments previously allocated to that link. The fragments are distributed to the links in the link bundle according to the distribution pattern from a first link entry to a last link entry in the distribution pattern. The distribution pattern is repeated after the last link entry.

Other features and advantages of the present invention will be apparent from the accompanying drawings and from the detailed description which follows.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

A method and a system for distributing Multilink Frame Relay (MFR) fragments are disclosed. A link distribution pattern is established based on a total speed of the links in a link bundle and a minimum possible link speed that is supported by a system. A link is selected when it is capable of transmitting a fragment in a shortest time while decreasing out-of-sequence arrival. A faster link in the link bundle may appear in the distribution pattern more than once. Each fragment is distributed to a link in the link bundle based on the distribution pattern.

Figure 1:
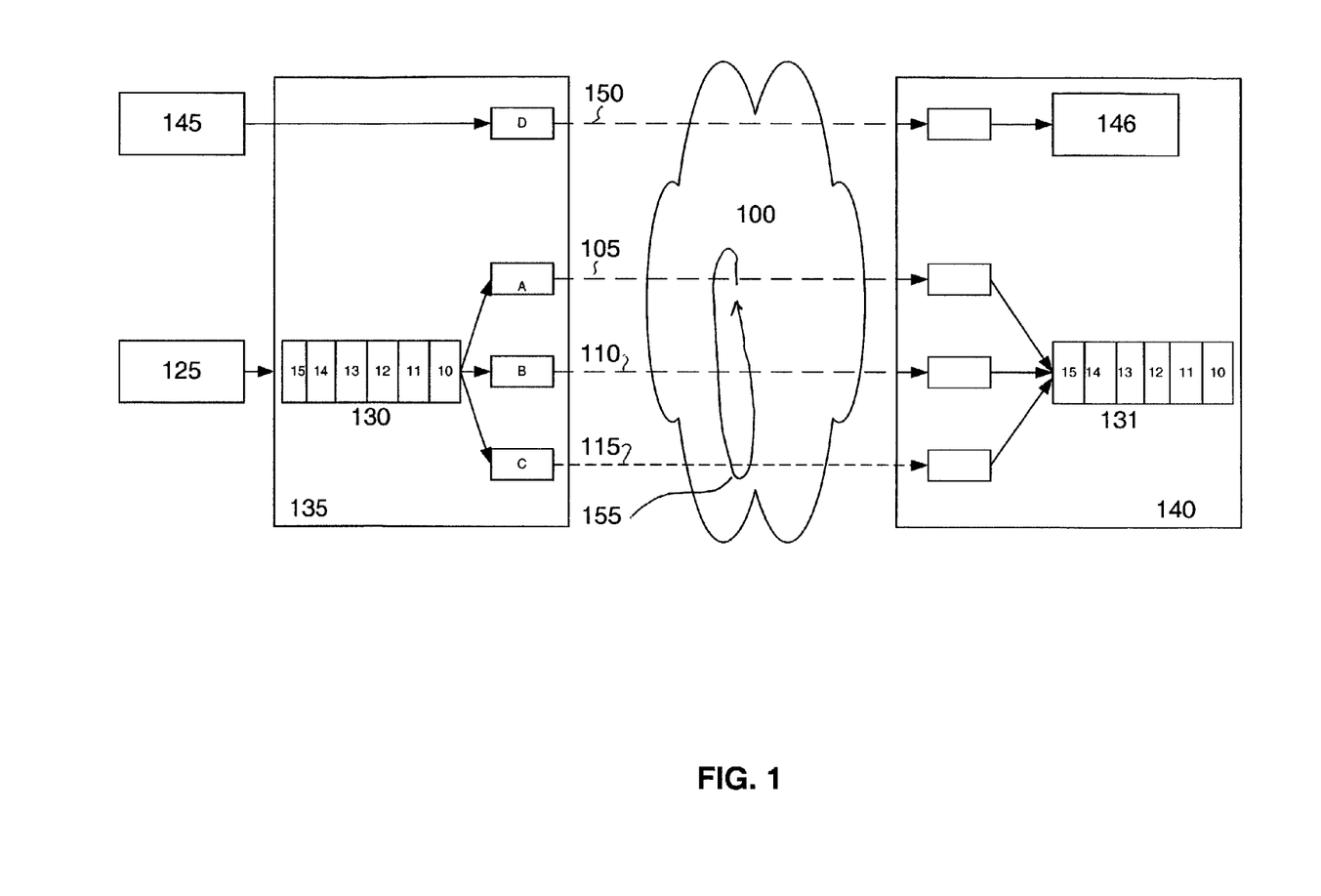
FIG. 1 is an illustration of an end-to-end data transmission using multilink frame relay.

FIG. 1 is an illustration of an end-to-end data transmission using MFR. The data processing engine (DPE) 135 and DPE 140 have previously been configured to transmit and receive data respectively using MFR across network 100. In this example, 0.5 Mbps is a minimum possible link speed supported by the DPE 135. Frame relay frames coming into the DPE 135 are sent to the DPE 140 using parallel transmission paths on a frame-by-frame basis. Depending on how the links are configured, a frame may be sent to a link or it may be sent to a link bundle. For example, frame 145 is sent from DPE 135 to port "D" across a single link 150 and arrives at DPE 140 as frame 146. Frame 125 is fragmented into a group of MFR fragments 130, sent to ports "A", "B", and "C" across a link bundle 155 formed by links 105, 110 and 115, and arrives as a group of MFR fragments 131. Each group of MFR fragments 130 and 131 contains fragments 10 to 15. The links 150, 105, 110 and 115 supported by the DPE 135 may have different link speeds. For example, the link speed for the link 150 may be at 0.5 Mbps, while the link speeds for the links 105, 110 and 115 may be at 3 Mbps, 2 Mbps, and 1 Mbps, respectively. The links 105, 110 and 115 are bundled together to form a logical link across the network 100.

Each of the fragments 10 to 15 may contain information about the frame 125, information about its sequence, and a payload. The information about the sequence helps the DPE 140 reassemble the arriving fragments in the correct sequence. Within the fragmented frame, the fragment sequence information may include a sequence number, a beginning bit, and an ending bit. For example, the first fragment 10 may have its beginning bit set to one and its ending bit set to zero. The first fragment 10 establishes a sequence number for the subsequent fragments. The last fragment 15 may have its beginning bit set to zero and its ending bit set to one. The intermediate fragments 11 to 14 have their beginning and ending bits to zero and also increment their sequence numbers. In another example, the beginning and the ending of each fragment may be represented by a bit sequence.

The fragments 10 to 15 are in a particular sequence before being sent by the DPE 135 and ideally are expected to arrive at the DPE 140 in the same sequence. However, since the link speed of each of the links 105, 110, and 115 may be different, and since each of the fragments 10 to 15 may be distributed to any one of the links 105, 110, and 115, the fragments 10 to 15 may arrive out-of-sequence. For example, the link speed of the link 105 may be three times faster than the link speed of the link 115, the link speed of the link 110 may be two times faster than the link speed of the link 115, and the link speed of the link 105 is one and one half times faster than the link speed of the link 110.

The sequence number of each arriving fragment is examined by the DPE 140 to determine its place in the original sequence. Using buffers and delay (or sequencing) timers, the DPE 140 stores the out-of-sequence fragments and waits for slow-arriving fragments to arrive before it re-assembles the fragments back in the original sequence. When multiple fragments arrive out-of-sequence, the delay may be longer. For example, when the fragment 13 arrives at the DPE 140 immediately after the fragment 10 arrives, two delay timers may be triggered, one to wait for the fragment 11 and the other to wait for the fragment 12. When this happens, the overall transmission speed of the link bundle 155 is impacted. When the delay timers expire and the expected fragment(s) does not arrive, it is considered lost and retransmission of the entire frame 125 may be necessary. Note that the fragments 10 to 14 are similar in size, and the last fragment 15 may be smaller in size. Thus, the out-of-sequence arrival is mainly due to the speed of the links rather than due to the size of the fragments.

In one embodiment, the fragments are distributed to the links in the link bundle in a ratio similar to the ratio of the link speeds. Using the link speed example above, for every six fragments, three fragments are distributed to the link 105, two fragments are distributed to the link 110 and one fragment is distributed to the link 115. Thus, the ratio is 3:2:1. Note that when the link speeds are the same, this distribution technique is reduced to a 1:1:1 ratio among the three links resulting in a round robin distribution.

The distribution technique above provides a sum of fragments to be distributed to each of the link in the link bundle to improve utilization of the link speed. Although this technique addresses the link utilization problem, it does not address how the fragments are to be distributed to decrease out-of-sequence arrival problem. Referring to FIG. 1 and using the same link speed example above, when the first three fragments 10, 11 and 12 are consecutively distributed to the link 105 and the fragment 13 is distributed next to the link 110, there is a high possibility that the fragment 13 will arrive at the DPE 140 earlier than the fragment 12. This requires the DPE 140 to buffer the fragment 13 and to wait for the arrival of the fragment 12.

Figure 2:
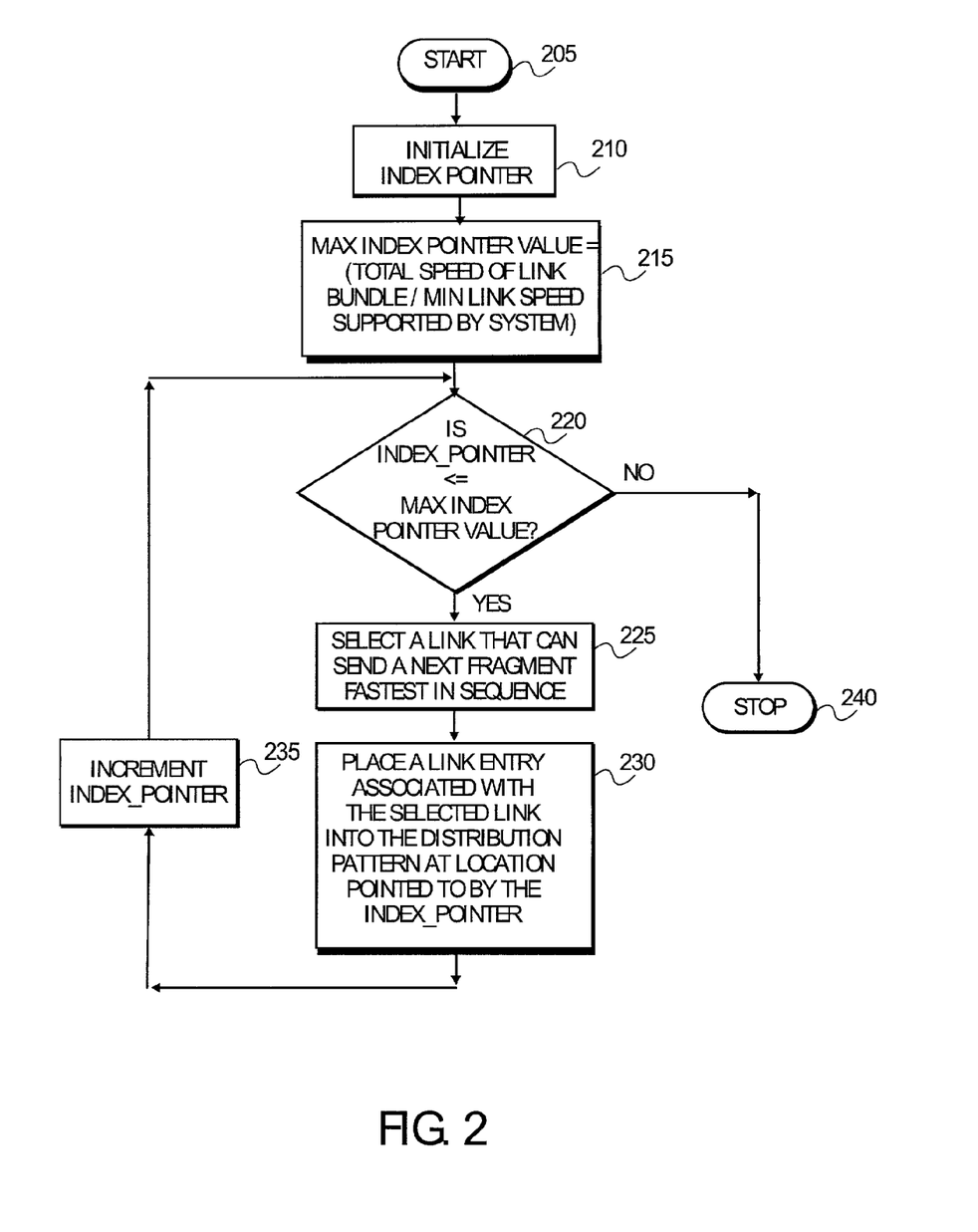
FIG. 2 is a flow diagram illustrating a process of establishing a distribution pattern.

FIG. 2 is a flow diagram illustrating a process of establishing a distribution pattern. The process starts at block 205. At block 210, an index pointer is initialized to a value pointing to a beginning of the distribution pattern. The initial value indicates that the index pointer is pointing to a first link entry in the distribution pattern. At block 215, a maximum index pointer value is determined. This maximum index pointer value identifies a last link entry in the distribution pattern. In one embodiment, the maximum index pointer value is determined by dividing a total link speed of the link bundle by a minimum possible speed of a link supported by the system. Note that the speed for any link in the system is always an integer multiple of the minimum possible link speed for a link in the system. For example, when the link bundle includes three links at 3 Mbps, 2 Mbps and 1 Mbps, then the total speed of the link bundle is six (3+2+1). When the minimum possible link speed supported by the system is 0.5 Mbps, the maximum index pointer value is:

$$\frac{3+2+1}{0.5} = \frac{6}{0.5} = 12.$$

The distribution pattern in this example has twelve entries to distribute twelve fragments. When the minimum possible link speed supported by the system is 1 Mbps, the maximum index pointer value is:

$$\frac{3+2+1}{1} = \frac{6}{1} = 6.$$

The distribution pattern in this example has six entries to distribute six fragments.

At block 220, a test is made to determine if the value of the index pointer is less than or equal to the maximum index pointer value. If it is greater than the maximum index pointer value, the process stops at block 240. If it is less than or equal to the maximum index pointer value, the process moves to block 225 where a link in the link bundle is selected as a link entry in the distribution pattern at a location (or position) pointed to by the index pointer. The selected link is the link that is capable of transmitting a fragment in a fastest transmit time while decreasing out-of-sequence arrival possibility. In one embodiment, this fastest transmit time is determined by using the following formula:

New transmit time=Old transmit time+(fragment size*(1/link speed))

where the "New trasmit time" is the sum of a) the time the link takes to transmit the fragments that have been allocated to it previously for distribution, and b) the time the link would take to transmit the next fragment; the "Old transmit time" is the time the link takes to transmit fragments that have been allocated to it for distribution so far; the "fragment size" is the size of the MFR fragments; and the "link speed" is the transmit speed (or bandwidth) of the link being considered. In one embodiment, when multiple links have the same fastest transmit time, the link with the fastest link speed is selected.

At block 230, the selected link is placed as a link entry into the distribution pattern at the location (or position) pointed to by the index pointer. At block 235, the index pointer is incremented to point to a next location in the distribution pattern. The process flows back to block 220 until all of the entries in the distribution pattern have been identified.

Figure 3:
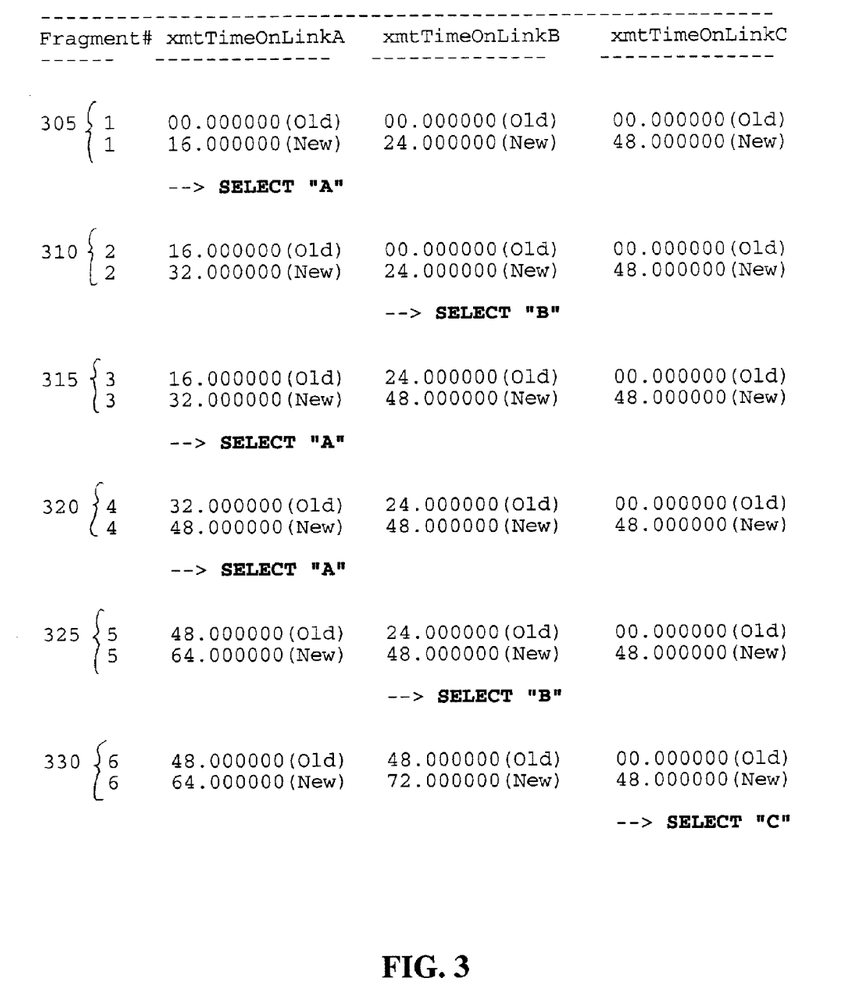
FIG. 3 is an example to illustrate selection of links in a link bundle to form the distribution pattern.

FIG. 3 is an example of the link selection performed in blocks 225 and 230 of FIG. 2. In this example, the "Max index pointer value" is six, and thus there are six fragments to be distributed. There are three links in the link bundle with each link associated with ports "A", "B" and "C" respectively. The ratio of the link speeds is 3:2:1 with the link associated with the port "A" being fastest and the link associated with port "C" being slowest. In this example, when it takes 16 time units for the link associated with the port "A" to transmit a fragment, then it would take 24 time units for the link associated with the port "B" to transmit a fragment of the same size, and it would take 48 time units for the link associated with the port "C" to transmit a fragment also of the same size.

At group 305, a link is to be selected for a first entry in the distribution pattern. Since none of the three links is transmitting any fragments, the old transmit time on each link is zero. As such, to transmit a fragment, each of the links will have a new transmit time of 16, 24 and 48 respectively. The link associated with the port "A" is selected because it has the fastest transmit time of 16.

At group 310, a link is to be selected for a second entry in the distribution pattern. The old transmit time for the links associated with the ports "B" and "C" is still zero because no fragment has been distributed to those links. However, the old transmit time for the link associated with the port "A" is at 16 because one fragment was distributed to that link. As such, to transmit a next fragment, each of the links will have a new transmit time of 32 (16+16), 24 and 48 respectively. Thus, the link associated with the port "B" is selected because it has the fastest transmit time of 24.

At group 315, a link is to be selected for a third entry in the distribution pattern. The old transmit time for the links associated with the port "C" is still zero because no fragment has been distributed to that link. However, the old transmit time for the links associated with the port "A" and "B" is at 16 and 24 respectively because one fragment was distributed to each of those two links. As such, to transmit a next fragment, each of the links will have a new transmit time of 32 (16+16), 48 (24+24) and 48 respectively. Thus, the link associated with the port "A" is selected because it has the fastest transmit time of 32.

At group 320, a link is to be selected for a fourth entry in the distribution pattern. The old transmit time for the links associated with the port "C" is still zero because no fragment has been distributed to that link. However, the old transmit time for the links associated with the port "A" and "B" is at 32 and 24 respectively because one fragment was distributed to each of those two links. As such, to transmit a next fragment, each of the links will have a new transmit time of 48 (32+16), 48 (24+24) and 48 respectively. In this example, because all three links have the same minimum transmit time of 48, the link associated with the port "A" is selected because it has the fastest link speed.

At group 325, a link is to be selected for a fifth entry in the distribution pattern. The old transmit time for the links associated with the port "C" is still zero because no fragment has been distributed to that link. However, the old transmit time for the links associated with the port "A" and "B" is at 48 and 24 respectively. As such, to transmit a next fragment, each of the links will have a new transmit time of 64 (48+16), 48 (24+24) and 48 respectively. Because there are two links having the minimum transmit time of 48, the link with the fastest link speed is selected. In this case, the link associated with the port "B" is selected.

At group 330, a link is to be selected for a sixth entry in the distribution pattern. The old transmit time for the links associated with the port "C" is still zero because no fragment has been distributed to that link. However, the old transmit time for the links associated with the port "A" and "B" is at 48 and 48 respectively. As such, to transmit a next fragment, each of the links will have a new transmit time of 64 (48+16), 72 (48+24) and 48 respectively. Thus, the link associated with the port "C" is selected because it has the fastest transmit time of 48. The distribution pattern is therefore:

A B A A B C.

The distribution pattern distributes three fragments to the first link (port "A"), two fragments to the second link (port "B") and one fragment to the third link (port "C"). Thus, utilization of the link speed of each link is not compromised even though the same link may not always be consecutively selected. In one embodiment, the process described in FIG. 2 is executed only once to determine the distribution pattern. The distribution pattern is repeated until all of the fragments are distributed. Note that the distribution pattern can be applied regardless of the fragment size. For example, when there are twelve fragments of 80 bytes each, the sequence of link selected is:

A B A A B C A B A A B C, where the distribution pattern is repeated once.

Although the distribution pattern may not guarantee that all of the fragments will arrive in the correct sequence, it may reduce out-of-sequence distance between arriving fragments. As such, the number of triggered delay timers may be reduced and the overall transmission speed of the link bundle may be improved. In one embodiment, the distribution pattern may be implemented as an array data structure.

For example, the array for the above distribution pattern may be implemented as:

| | Index | Array (index) | |
|---|---|---|---|
| | 0 | 6 | ← Number of entries in pattern |
| Minimum index value -> | 1 | A | ← First link entry in pattern |
| | 2 | B | |
| | 3 | A | |
| | 4 | A | |
| | 5 | B | |
| Maximum index value -> | 6 | C | ← Last link entry in pattern | where "index" is the index pointer pointing to an entry in the array and "array (index)" is the corresponding link entry or value of the location in the array pointed to by the index pointer. For example, array (5) has a value of "B", etc. An index pointer value of "0" may be used to provide the number of entries in the distribution pattern. As discussed above, this is determined by dividing the total link speed of the link bundle by a minimum possible link speed that is supported by the system.

Figure 4:
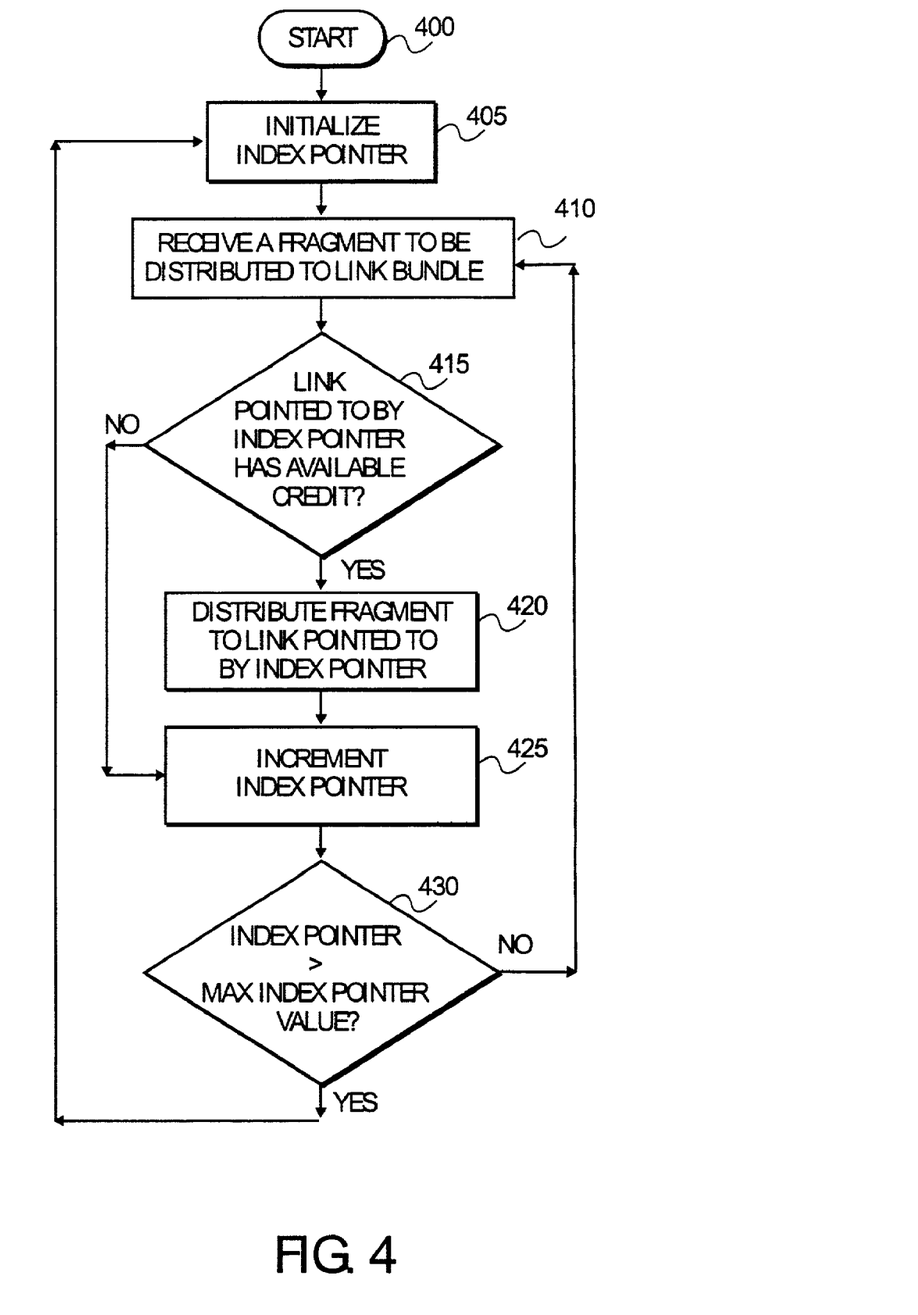
FIG. 4 is an illustration of fragment distribution process using the distribution pattern.

FIG. 4 is an illustration of a fragment distribution process using a distribution pattern. The distribution pattern is established by using the process described in FIG. 2. The process selects a link associated with a link entry in the distribution pattern to distribute a fragment to be transmitted. The process starts at block 400. Initially, an index pointer is initialized to a value pointing to a first location in the distribution pattern, as shown in block 405. At block 410, a next fragment is selected for transmission.

In one embodiment, at predetermined periodic intervals, each link in the link bundle is allocated a credit value. The credit value may be allocated to each link based on the link speed and periodic interval gap. In one embodiment, the credit allocated may be equal to the maximum number of bytes the link can transmit in the periodic interval gap. For example, a link that is three times faster than another link is allocated three times more credit than the other link. At block 415, a test is made to determine if a link associated with the link entry in the distribution pattern pointed to by the index pointer has available credit. In one embodiment, if there is no available credit, that link entry is skipped and the process flows to block 425 where the index pointer is incremented to point to a next location for a next link entry in the distribution pattern.

From block 415, if the link has available credit, the process flows to block 420 where the fragment is distributed to that link. In one embodiment, the available credit for that link may be reduced by size of the transmitted fragment. The process then flows to block 425 where the index pointer is incremented to point to a next location for a next link entry in the distribution pattern. At block 430, a test is made to determine if the value of the index pointer is greater than a maximum number of entries in the distribution pattern. If it is not greater, the process flows back to block 410 to get a next fragment. Alternatively, if it is greater, then the process moves back to block 405 where index pointer is reset to point to the beginning location of the distribution pattern.

The process described in FIG. 4 continues by distributing the fragments to the links identified in the distribution pattern and by repeating the distribution pattern. Of course, the process may stop when there is no more fragments to be distributed or it may just stays in an idle state at block 410 waiting for a next fragment to be distributed. In one embodiment, when the process stays idle at block 410 for a period longer than a predetermined idle time limit, the index pointer is reset to point to the beginning of the distribution pattern.

Figure 5:
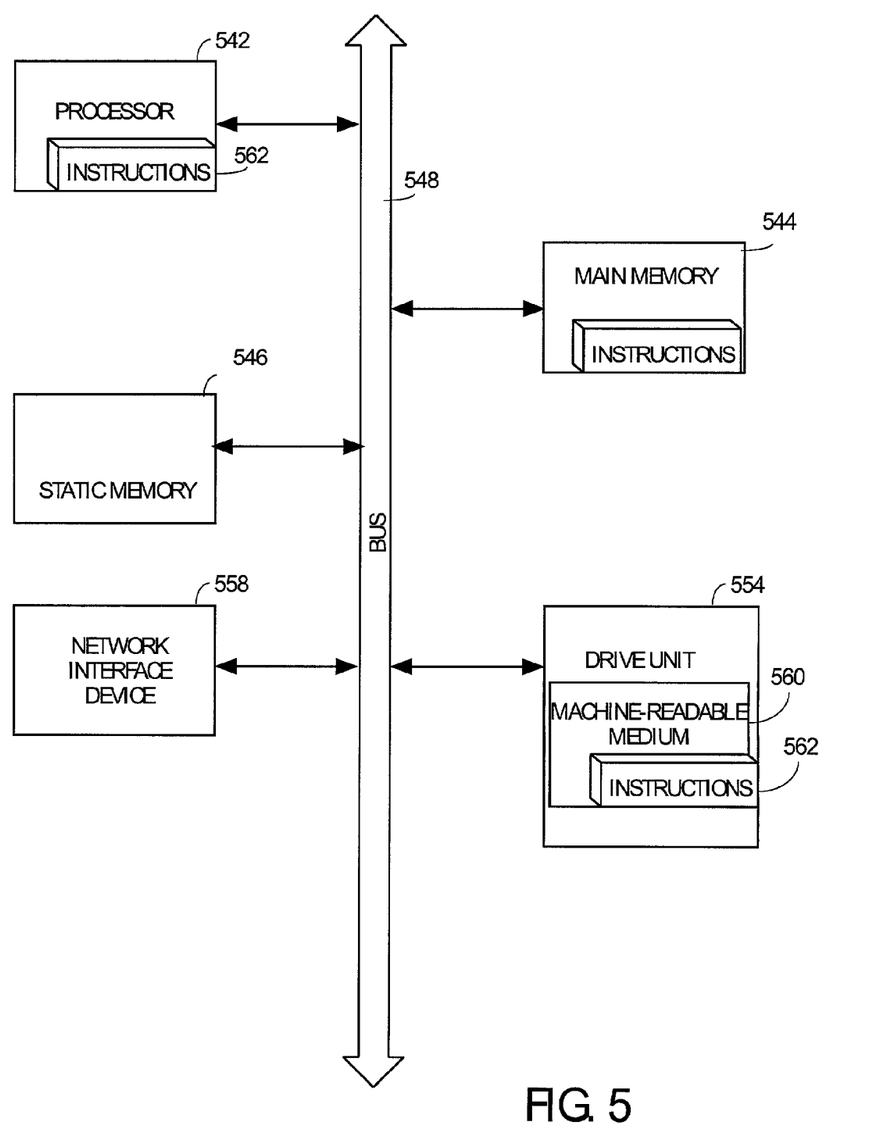
FIG. 5 is an illustration of one embodiment of a digital processing system that can be used with the present invention.

FIG. 5 is an illustration of one embodiment of a digital processing system that can be used with the present invention. The operations of the various methods of the present invention may be implemented by a processing unit 542 in a digital processing system. The processing unit 542 executes sequences of computer program instructions 562. For example, the computer program instructions 562 may include instructions to form the distribution pattern and instructions to distribute fragments to links in the link bundle according to the distribution pattern, as described above. The instructions 562 may be stored in a memory which may be considered to be a machine readable storage media 560. The memory is coupled with the processing unit 542 using a bus 548. The memory may be random access memory 546. The memory may also be read-only memory, a persistent storage memory, such as mass storage device 554 or any combination of these devices. Execution of the sequences of instruction 562 causes the processing unit 542 to perform operations according to the present invention. The instructions 562 may be loaded into memory of the computer from a storage device or from one or more other digital processing systems (e.g. a server computer system) over a network connection (not shown). The instructions 562 may be stored concurrently in several storage devices (e.g. DRAM and a hard disk, such as virtual memory). Consequently, the execution of these instructions may be performed directly by the processing unit 542. The system may include a network interface device 558 to transmit frame fragments. For example, the network interface device 558 may comprise connection to the bundle link and any other individual links.

In other cases, the instructions 562 may not be performed directly or they may not be directly executable by the processing unit 542. Under these circumstances, the executions may be executed by causing the processing unit 542 to execute an interpreter that interprets the instructions 562, or by causing the processing unit 542 to execute instructions which convert the received instructions 562 to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

A technique for distributing MFR fragments to a link bundle has been described. The fragments are distributed based on a distribution pattern. The distribution pattern is determined based on how long it may take for a link to transmit a next fragment taking into consideration the number of fragments that have been previously distributed to that link. The distribution pattern allows for improved utilization of link speed and decreases out-of-sequence arrival of the fragments.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:

establishing a distribution pattern to distribute multilink frame relay (MFR) fragments, the distribution pattern including a sequence of link entries associated with links in a link bundle, wherein each link entry is identified when the associated link is configured to transmit a fragment in a fastest transmit time, wherein the fastest transmit time is determined based on the link speed of the link and a transmit time for the link to transmit other fragments previously allocated to that link, wherein the number of link entries in the distribution pattern is determined by dividing a total link speed of the link bundle by a minimum non-zero link speed supported by a system; and distributing the fragments according to the distribution pattern from a first link entry to a last link entry in the distribution pattern, wherein the distribution pattern is repeated after the last link entry.

2. The method of claim 1, wherein the fastest transmit time is further determined based on a fragment size.

3. The method of claim 2, wherein when more than one link is capable of transmitting a fragment in a fastest transmit time, the link entry is identified based on an associated link having a fastest link speed.

4. The method of claim 1, wherein the transmit time for the link to transmit other fragments previously allocated to that link is accumulative until the last link entry in the distribution pattern is determined.

5. The method of claim 1, wherein distributing the fragments according to the distribution pattern comprises:

selecting a link entry from the distribution pattern in the sequence from the first link entry to the last link entry;

determining if a link associated with the selected link entry has available credit;

when the link has available credit, distributing the fragment to the link and reducing the credit available to that link; and when the link does not have available credit, selecting a next link entry in the sequence.

6. The method of claim 5, wherein the credit is allocated to each link based on the link speed and a periodic interval gap.

7. The method of claim 5, wherein the distribution pattern is repeated at the first link entry and before selecting the last link entry, after expiration of a predetermined waiting time period to receive a fragment to be distributed to a link in the link bundle.

8. The method of claim 1, wherein the distribution pattern is implemented as an array data structure.

9. A method, comprising:

determining a number of positions in a distribution pattern to distribute multilink frame relay (MFR) fragments, the distribution pattern including a sequence of link entries associated with links in a link bundle;

identifying a link entry for a first position in the distribution pattern, comprising:

selecting a link in the link bundle that is configured to transmit a first fragment in a fastest time based on the link speed of each link, a total transmit time associated with each link, and a fragment size;

placing a link entry associated with the selected link in the first position in the distribution pattern;

adding the fastest transmit time to the total transmit time associated with the selected link; and repeating said identifying for a link entry for a next position in the distribution pattern to transmit a next fragment until a link entry is selected for all positions in the distribution pattern.

10. The method of claim 9, wherein the number of positions in the distribution pattern is based on a total link speed of links in a link bundle and a minimum possible link speed of a link supported by a system.

11. The method of claim 9, wherein when there is more than one link having the same fastest transmit time, a link associated with a fastest link speed is selected.

12. The method of claim 9, further comprising distributing fragments according to the distribution pattern from the link entry in the first position to a link entry in a last position in the distribution pattern, wherein the distribution pattern is repeated after the link entry in the last position.

13. The method of claim 12, wherein distributing the fragments according to the distribution pattern comprises:

selecting a link entry from the distribution pattern in a sequence from the first position to the last position;

determining if a link associated with the selected link entry has available credit;

when the link has available credit, distributing a current fragment to the link and reducing the available credit for that link; and when the link does not have available credit, selecting a next link entry in the sequence.

14. The method of claim 13, wherein the credit is allocated to each link based on the link speed and a periodic interval gap.

15. A computer readable medium having stored thereon sequences of instructions which are executable by a system, and which, when executed by the system, cause the system to:

establish a distribution pattern to distribute multilink frame relay (MFR) fragments, the distribution pattern including a sequence of link entries associated with links in a link bundle, wherein each link entry is placed in the distribution pattern when the link is configured to transmit a fragment in a fastest transmit time, the fastest transmit time determined based on the link speed of the link and a transmit time for the link to transmit other fragments previously allocated to the link, wherein the number of link entries in the distribution pattern is determined by dividing a total link speed of the link bundle by a minimum non-zero link speed supported by a system; and distribute the fragments according to the distribution pattern from a first link entry to a last link entry in the distribution pattern, wherein the distribution pattern is repeated after the last link entry.

16. The computer readable medium of claim 15, wherein the fastest transmit time is further determined based on a fragment size.

17. The computer readable medium of claim 15, wherein when more than one link is capable of transmitting a fragment in a fastest transmit time, the link entry is determined based on an associated link having a fastest link speed.

18. The computer readable medium of claim 15, wherein the transmit time for the link to transmit other fragments previously allocated to that link is accumulative until the last link entry in the distribution pattern is determined.

19. The computer readable medium of claim 15, wherein the instructions to distribute the fragments according to the distribution pattern comprises instructions to:
  select a link entry from the distribution pattern in the sequence from the first link entry to the last link entry;
  determine if a link associated with the selected link entry has available credit;
  when the link has available credit, distribute the fragment to the link and reduce the credit available to that link; and
  when the link does not have available credit, select a next link entry in the sequence.

20. The computer readable medium of claim 19, wherein the credit is allocated to each link based on the link speed and the periodic interval gap.

21. The computer readable medium of claim 15, wherein the distribution pattern is repeated at the first link entry and before selecting the last link entry after expiration of a predetermined waiting time period to receive a fragment to be distributed to a link in the link bundle.

22. The computer readable medium of claim 15, wherein the distribution pattern is implemented as an array data structure.

23. A computer readable medium having stored thereon sequences of instructions which are executable by a system, and which, when executed by the system, cause the system to:
  determine a number of positions in a distribution pattern;
  identify a link entry for a first position in the distribution pattern, comprising instructions to:
    select a link in the link bundle that is configured to transmit a first fragment in a fastest time based on the link speed of each link, a total transmit time associated with each link, and a fragment size;
    place a link entry associated with the selected link in the first position in the distribution pattern; and
    add the fastest transmit time to the total transmit time associated with the selected link; and
  repeat said instructions to identify for a link entry for a next position in the distribution pattern to transmit a next fragment until a link entry is selected for all positions in the distribution pattern.

24. The computer readable medium of claim 23, wherein the number of positions in the distribution pattern is based on a total link speed of links in a link bundle and a minimum possible link speed supported by a system.

25. The computer readable medium of claim 23, wherein when there is more than one link having the same fastest transmit time, a link associated with a fastest link speed is selected.

26. The computer readable medium of claim 23, further comprising instructions to distribute fragments according to the distribution pattern from the link entry in the first position to a link entry in a last position in the distribution pattern, wherein the distribution pattern is repeated after the link entry in the last position.

27. The computer readable medium of claim 26, wherein the instructions to distribute the fragments according to the distribution pattern comprises instructions to:
  select a link entry from the distribution pattern in a sequence from the first position to the last position;
  determine if a link associated with the selected link entry has available credit;
  when the link has available credit, distribute a current fragment to the link and reduce the credit available to that link; and
  when the link does not have available credit, select a next link entry in the sequence.

28. The computer readable medium of claim 27, wherein the credit is allocated to each link based on the link speed.

29. A system, comprising:
  a memory;
  a processor configured to establish a distribution pattern to distribute multilink frame relay (MFR) fragments, the distribution pattern including a sequence of link entries associated with links in a link bundle, wherein each link entry is placed in the distribution pattern when the link is configured to transmit a current fragment in a fastest transmit time, wherein the fastest transmit time is determined based on the link speed of the link and a transmit time for the link to transmit other fragments previously allocated to the link, wherein a number of link entries in the distribution pattern is determined by dividing a total link speed of the link bundle by a minimum non-zero link speed supported by the system.

30. The system of claim 29, wherein the processor is further configured to distribute the fragments according to the distribution pattern from a first link entry to a last link entry in the distribution pattern, wherein the distribution pattern is repeated after the last link entry.

31. The system of claim 30, wherein, to distribute the fragments according to the distribution pattern, the processor is configured to:
  select a link entry from the distribution pattern in the sequence from the first link entry to the last link entry;
  determine if a link associated with the selected link entry has available credit;
  when the link has available credit, distribute the fragment to the link and reduce the credit available to that link; and
  when the link does not have available credit, select a next link entry in the sequence.

32. The system of claim 31, wherein the credit is allocated to each link based on the link speed and a periodic interval gap.

33. The system of claim 29, wherein the fastest transmit time is further determined based on a fragment size.

34. The system of claim 33, wherein when more than one link is capable of transmitting a current fragment in the fastest transmit time, a link entry associated with a link having a fastest link speed is placed in the distribution pattern.

35. The system of claim 29, wherein the transmit time for the link to transmit other fragments previously allocated to that link is accumulative until the last link entry in the distribution pattern is determined.

36. The system of claim 29, wherein the distribution pattern is repeated at the first link entry and before selecting the last link entry after expiration of a predetermined waiting time period to receive a fragment to be distributed to a link in the link bundle.

37. The system of claim 29, wherein the distribution pattern is implemented as an array data structure.

38. A system, comprising:
  means for establishing a distribution pattern to distribute multilink frame relay (MFR) fragments, the distribution pattern including a sequence of link entries associated with links in a link bundle, wherein a number of link entries in the distribution pattern is determined by dividing a total link speed of the link bundle by a minimum non-zero link speed supported by the system; and means for distributing the fragments according to the distribution pattern from a first link entry to a last link entry in the distribution pattern, wherein the distribution pattern is repeated after the last link entry.

39. The system of claim 38, wherein the means for distributing the fragments according to the distribution pattern comprises means for selecting a link entry from the distribution pattern based on available credit.

40. The system of claim 38, wherein the means for distributing the fragments according to the distribution pattern comprises means detecting expiration of a predetermined waiting period and means for resetting to the first entry in the distribution pattern.

41. A method, comprising:
establishing a distribution pattern to distribute multilink frame relay (MFR) fragments, the distribution pattern including a sequence of link entries associated with links in a link bundle, wherein a number of link entries in the distribution pattern is determined by dividing a total link speed of the link bundle by a minimum non-zero link speed supported by the system; and
distributing the fragments according to the distribution pattern from a first link entry to a last link entry in the distribution pattern, wherein the distribution pattern is repeated after the last link entry.

42. The method of claim 41, wherein each link entry in the distribution pattern is determined based on the associated link being able to transmit a fragment in a fastest transmit time, the fastest transmit time determined based on the link speed of the link, a fragment size, and a transmit time for the link to transmit other fragments previously allocated to that link.

43. The method of claim 42, wherein when more than one link is capable of transmitting a fragment in the fastest transmit time, the link entry is determined based on an associated link having a fastest link speed.

44. The method of claim 41, wherein the transmit time for the link to transmit other fragments previously allocated to that link is accumulative until the last link entry in the distribution pattern is determined.

45. The method of claim 41, wherein the fragments are further distributed based on available credit.

46. An apparatus, comprising:
a link bundle including two or more links, the link bundle configured to transmit multilink frame relay (MFR) fragments from a first data processing engine to a second data processing engine according to a distribution pattern, wherein the distribution pattern comprises link entries associated with each of the two or more links in the link bundle, wherein a number of entries in the distribution pattern is determined by dividing a total speed of the links in the link bundle by a minimum non-zero link speed supported by a system.

47. The apparatus of claim 46, wherein the distribution pattern is repeated after a last link entry.

48. The apparatus of claim 46, wherein each link entry in the distribution pattern is identified based on a link speed of a link and a transmit time for the link to transmit other fragments previously allocated to that link.

49. An apparatus, comprising:
means for transmitting multilink frame relay (MFR) fragments from a first data processing engine to a second data processing engine according to a distribution pattern, wherein the distribution pattern comprises link (entries associated with links in a link bundle; and
means for determining a number of entries in the distribution pattern by dividing a total speed of the links in the link bundle by a minimum non-zero link speed supported by a system.

50. The apparatus of claim 49, further comprising means for determining a number of entries in the distribution pattern.

51. The apparatus of claim 49, further comprising means for identifying each link entry in the distribution pattern.

* * * * *